United States Patent [19]

Winston

[11] 4,061,272
[45] Dec. 6, 1977

[54] IRRIGATION DEVICE

[76] Inventor: Emanuel A. Winston, 871 Marion Ave., Highland Park, Ill. 60035

[21] Appl. No.: 641,739

[22] Filed: Dec. 18, 1975

Related U.S. Application Data

[63] Continuation-in-part of Ser. No. 588,900, June 20, 1975, abandoned.

[51] Int. Cl.² .................. A01G 27/00; B05B 15/00
[52] U.S. Cl. ............................. 239/145; 61/13; 156/78; 239/450; 239/542; 264/46.6
[58] Field of Search ............... 239/145, 542, 450, 566, 239/567; 61/12, 13; 138/115–117; 222/187; 15/143 R; 156/78; 264/46.6

[56] References Cited

U.S. PATENT DOCUMENTS

| 92,298 | 7/1869 | Francis | 15/244 R |
|---|---|---|---|
| 2,798,768 | 7/1957 | Babin | 239/145 |
| 2,807,505 | 9/1957 | Weitzel | 239/542 X |
| 3,021,642 | 2/1962 | Ewing | 239/145 X |
| 3,361,359 | 1/1968 | Chapin | 239/145 |
| 3,419,455 | 12/1968 | Roberts | 264/46.6 X |
| 3,465,529 | 9/1969 | Helle | 61/13 X |
| 3,613,309 | 10/1971 | Coburn | 239/145 X |
| 3,901,448 | 8/1975 | Babin | 239/145 |

Primary Examiner—Evon C. Blunk
Assistant Examiner—Andres Kashnikow
Attorney, Agent, or Firm—Stefan M. Stein; Robert F. Frijouf

[57] ABSTRACT

An irrigation device in the form of an elongated conduit of predetermined length wherein the conduit comprises a one piece wall of plastic material formed by extrusion in a continuous length. The conduit comprises at least two compartments having specific relative dimensions and disposed in fluid communication with one another wherein the configuration and disposition of the two compartments are defined by the configuration of the single wall portion which is formed from the single piece of extruded material. Dispersion means in the form of a strip of elongated liquid permeable material is mounted within one of the compartments and configured to extend outwardly to the exterior of the conduit whereby liquid is dispersed through the two compartments to the exterior of the conduit through the liquid permeable dispersion element by a capillary-type action.

13 Claims, 8 Drawing Figures

U.S. Patent  Dec. 6, 1977  Sheet 1 of 2  4,061,272
FIG. 1
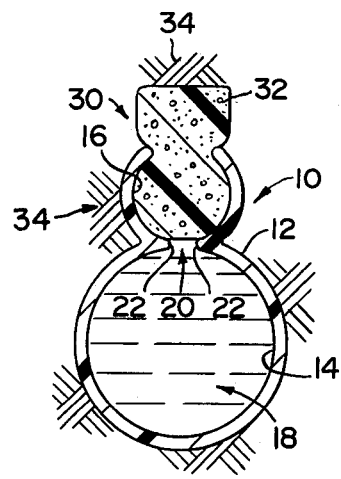
FIG. 2
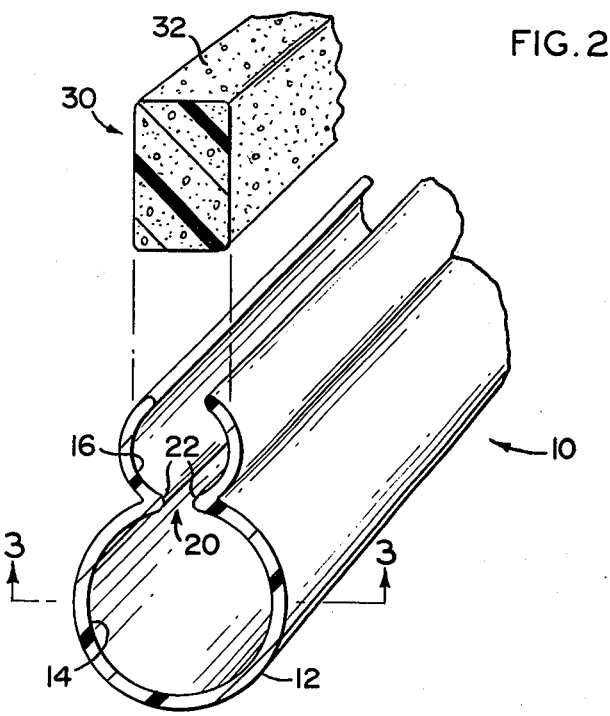
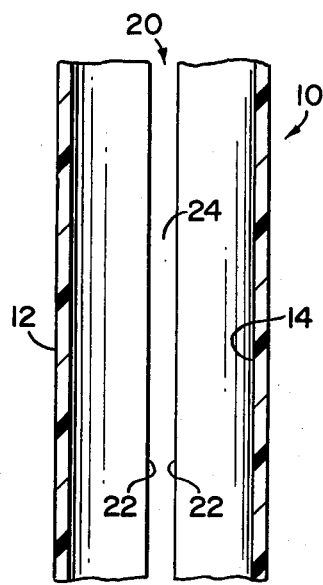
FIG. 3
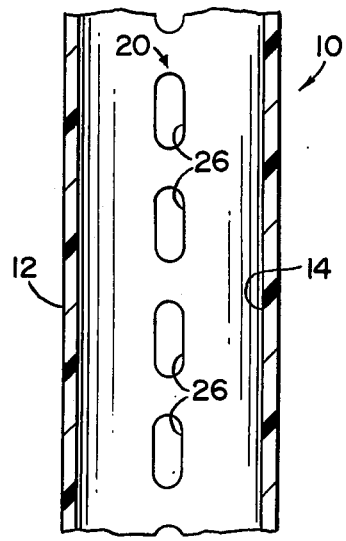
FIG. 4
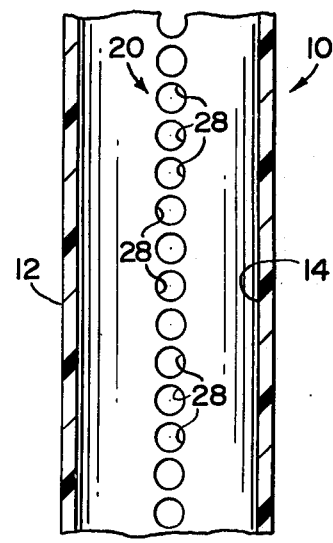
FIG. 5

IRRIGATION DEVICE

This is a continuation-in-part application my presently co-pending application Ser. No. 588,900 filed 06/20/75, now abandoned.

BACKGROUND OF THE INVENTION

1. Field of the Invention

This invention relates to a conduit or pipe-like structure having means to disperse liquid from the interior of the conduit to the exterior thereof by means of a spongelike dispersion element which is liquid permeable and generally structured to transfer liquid therethrough by capillary action.

Description of the Prior Art

The importance and concept of irrigation has been well known and practiced for many years. In the past, various systems including open canals, ditches, etc. have been used to convey water from an adequate source to various land masses for the obvious purpose of moistening soil and thereby encourage cultivation. While such "primitive" methods are still in common use today, the disadvantages of these prior art systems are well known.

In order to supplement such systems in a more efficient manner, water is frequently conveyed by systems of pipes or conduits in which sprinkling devices are installed at spaced points along the length of the conduit. Water, either by itself or carrying a soil enriching substance is pumped through the pipe and discharged to the land at the desired or predetermined point. Frequently, sprinklers attached to the water carrying irrigation conduit further disperse the water, under pressure, to areas other than the half defined by the conduit itself. However, sprinkling in this manner sometimes includes the inherent disadvantage of substantial loss of water through evaporation and run-off.

The irrigation and farming industry has discovered that when placing irrigation conduits on the surface or immediately below the surface of the ground, a frequent problem of clogging has been encountered. In this sense it is common for the soil to enter the apertures in the conduit or irrigation pipe through which water is intended to exit. If the irrigation pipe remains inoperative for any relatively long period of time, the soil becomes firmly implanted within the spray apertures of the conduit resulting in certain portions of the irrigation pipe becoming inoperative. To overcome this problem, the prior art includes the use of a porous receptacle or conduit placed in the ground so that the soil surrounding the receptacle or conduit may be moistened by seepage of the liquid through the porous walls of the pipe. While eliminating a number of problems concerned with the clogging aspect set forth above, the system further includes the advantage of reducing evaporation and run-off. However, such a system is not well adapted for the distribution of liquids over substantial areas. Such a porous conduit or receptacle structure is disclosed in the U.S. Pat. to Weitzel, No. 2,807,505.

Other U.S. patents generally representing the state of the art of irrigation devices include the following U.S. Pat. Nos. 3,870,236, Sahagun-Barragan; 3,797,754, Spencer; 2,798,768, Babbin; and 2,769,668, Richards. While the structures represented in the above-noted U.S. Patents are operable and functional, and certainly adaptable for certain irrigation purposes, a number of these representative devices do incorporate inherent problems set forth above.

SUMMARY OF THE INVENTION

This invention relates to an irrigation device in the form of an elongated conduit. In one embodiment of the present invention, the conduit is formed by a one piece wall of continuous length formed by extrusion from a plastic or otherwise resinous material. Ideally, the conduit should be relatively flexible so that it can be manipulated for placement along a path other than a straight line.

A plurality of compartments, and preferably two compartments are formed on the interior of the pipe. More specifically, a first compartment having generally larger diameter is interconnected in fluid communication with an adequate supply of liquid, such as water, to be dispensed from the conduit. A second compartment may be integrally formed from the one-piece wall of the conduit and disposed in direct fluid communication with the first conduit. The second conduit is of somewhat smaller transverse dimension and, accordingly, defines a smaller volume than the first compartment.

In one preferred embodiment of the present invention, the conduit has a cross-sectional configuration generally similar to a figure eight. In this figure eight configuration, when the eight is in an upright orientation, the first compartment as described herein is the lower of the two compartments wherein the second compartment is the upper of the two compartments.

An interconnecting means is integrally formed on the interior of the conduit means at the junction of the first and second compartment. More specifically, the one piece extruded wwall of the conduit means is formed to define an indentation wherein correspondingly positioned and oppositely disposed segments of the indented portion of the wall helps define the interconnecting means, and in one embodiment of the present invention, may comprise an elongated continuous channel interconnecting, in fluid communication, the first and second compartments. Alternately, the interconnecting means may comprise a plurality of apertures wherein at least a portion of the apertures are defined by a substantially elongated configuration generally similar to an oval shape.

Yet another embodiment of the present invention comprises the interconnecting means comprising a plurality of apertures having generally symmetrical circular or round apertures spaced apart in predetermined relation from one another.

One structural feature of the present invention comprises the interconnecting means, irrespective of the embodiment utilized, being specifically dimensioned to regulate fluid flow between the first compartment and the second compartment. The rate of fluid flow will be predetermined and is dependent upon the dimensions of the first compartment relative to the second compartment. It can readily be seen that the amount of liquid flowing from the first compartment to the second compartment should thus be regulated to determine the amount of actual dispersion of liquid from the conduit means as it passes from the second conduit through an exit opening therein as will be explained in greater detail hereinafter.

Another structural feature of the present invention comprises the provision of a dispersion means in the form of a substantially elongated liquid permeable member. This member may take the form of a urethane-type material which is flexible and specifically which is dimensioned relative to the second compartment so as to frictionally fit therein. Further structural features of the dispersion strip includes its dimensions being such that at least a portion thereof extends outwardly from the interior of the second compartment to the exterior thereof to provide sufficient surface area for accomplishing the desired rate of liquid dispersion from the interior of the conduit.

In one embodiment, the dispersion means is formed in place within the interior of the second compartment and thereby adheres to the interior surface thereof. More specifically, a polyurethane or like foam material and/or porous material may be applied to the interior of the second compartment in its fluid or non-cured state by relatively conventional means. In such non-cured state, the porous material immediately adheres to the interior surface of the second compartment prior to completely curing. This serves to create a substantially liquid-tight seal between the porous strip formed and the interior surface of the second compartment. Preferably, the porous material is formed along the length of the second compartment and further formed therein to extend outwardly from the exterior thereof in dispersing relation to the exterior or surrounding ground relative to the conduit.

In general operation, the conduit is placed along a predetermined path dependent upon the particular areas of soil desired to be irrigated. Water is directed from an adequate supply, through the interior of the conduit defined by the first compartment and then into the second compartment through the interconnecting means. At this point the water passes through the liquid permeable dispersion strip and, through capillary action, is dispersed to the soil surrounding the exterior of the pipe and, in particular, the region surrounding the dispersion strip.

Through this structure, adequate dispensing of the water to the surrounding soil can be readily accomplished without the inherent problems of clogging, etc. commonly associated with other prior art devices. In particular, the structure in the various embodiments set forth above is particularly advantageous in the prevention of clogging due to the existence of minerals in the water being dispensed. A common problem associated with prior art devices is the clogging of holes within the irrigation pipe by the build up of minerals which tend to clog any dispensing holes. The existence of the porous strip allows a filtering action to be performed tending to collect the mineral deposits. Removal of the porous dispensing means provides a longer operable life, wherein the porous strip may be readily replaced.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a front cross-sectional view of the irrigation conduit of the subject invention imbedded in surround soil to be irrigated.

FIG. 2 is a perspective view in exploded form of the irrigation conduit and dispersion strip and their relation to one another.

FIG. 3 is a bottom sectional view taken along line 3—3 of FIG. 2 showing the interconnecting means and the interior of the conduit.

FIG. 4 is a sectional view generally similar to that of FIG. 3 showing an alternate embodiment of the interconnecting means.

FIG. 5 is a sectional view generally similar to FIGS. 3 and 4 showing yet another embodiment of the interconnecting means of the present invention.

Similar reference characters refer to similar parts throughout the several views of the drawings.

DETAILED DESCRIPTION

Figure 6:
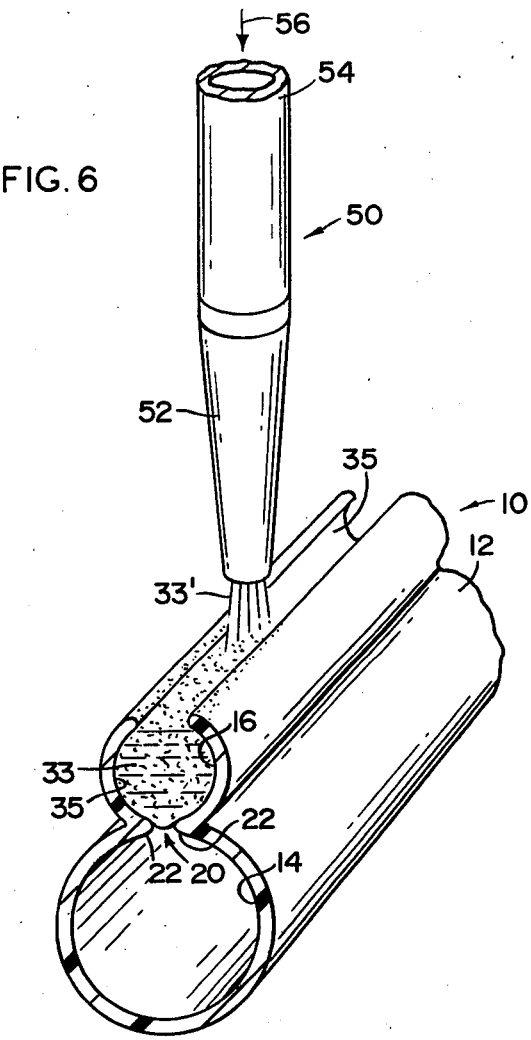
FIG. 6 is a cutaway view in partial section showing the process of application of the dispersing means in a porous strip.

As best shown in FIGS. 1 and 2, the subject invention is directed to an irrigation conduit means generally indicated as 10 which may include a one piece conduit wall 12 generally formed in a continuous length by an extrusion means.

The one piece conduit wall serves to define at least a first compartment 14 and a second compartment 16. Both of the first and second compartments 14 and 16, respectively, extend along the length of the conduit 10. The first compartment 14 has a somewhat larger diameter or transverse dimension and, accordingly, a larger volume than the second compartment 16. As previously mentioned, the first compartment 14 is interconnected in fluid communication with an adequate supply of liquid or fluid 18 which travels along the length of conduit 10 in the first compartment 14. The second compartment 16, as clearly indicated in FIGS. 1 and 2, has a somewhat smaller traverse dimension and, accordingly, a smaller volume in which to receive the liquid or water 18 passing from the first compartment 14. Fluid communication between compartment 14 and compartment 16 is established by interconnecting means generally indicated as 20. Interconnecting means 20 is formed by correspondingly positioned and oppositely disposed indentation portions 22 of conduit wall 12. This is best shown in FIGS. 1 and 2 and also FIGS. 6 through 8.

As shown in FIGS. 3, 4 and 5, the interconnecting means 20 may be in the form of a plurality of different embodiments to be described hereinafter.

FIG. 3 shows interconnecting means 20 in an elongated channel 24 integrally formed by the indentation portions 22 of conduit 12 as indicated above. This elongated channel 24 may extend along the length of the conduit 10 and by virtue of its interconnecting disposition between compartment 14 and compartment 16, establish fluid communication therebetween.

FIG. 4 relates to interconnecting means 20 being in the form of a plurality of apertures 26 having a generally elongated configuration. These apertures are arranged in spaced apart relation to one another and also are disposed substantially along the entire length of the conduit 10.

Yet another embodiment of the present invention is shown in FIG. 5 and comprises a plurality of apertures 28, each having a generally uniform or circular configuration also disposed in spaced apart relation to one another. The apertures 28 are formed integrally in the one piece conduit wall 10 and extend substantially along the length thereof.

The specific configuration and dimension of the interconnecting means 20 in the various embodiments shown in FIGS. 3, 4 and 5 determine the rate of fluid flow between the first compartment 14 and the second compartment 16. This in turn of course regulates the rate of delivery or dispersion of the water exiting conduit 10 to the surrounding soil. Regulation of the rate of dispersion can be controlled in part by the dimension and the various configuration shown in the alternate embodiment as desired.

With reference to FIGS. 1 and 2, the subject invention comprises a dispersion means generally indicated as 30 which includes an elongated strip of water or liquid permeable material 32. Dispersion strip 32 may be formed from a urethane or sponge-like porous material structured such that liquid 18 may pass therethrough by means of conventional capillary action.

The dimension of the dispersion strip 32 is such as to firmly fit within the second compartment 16 and take up a predetermined portion of the interior thereof. Dispersion strip 32 is further configured and dimensioned to extend outwardly from the interior of the second compartment 16 so as to disperse the liquid to the surrounding soil, generally indicated as 34.

Figure 7:
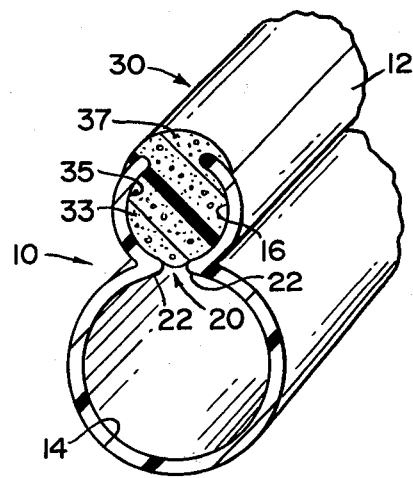
FIG. 7 is a cutaway view in partial section showing one embodiment of the present invention having the dispersing means formed by the process of FIG. 6.
Figure 8:
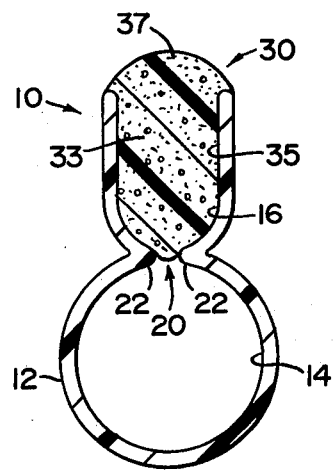
FIG. 8 is an end view in full section of yet another embodiment of the present invention.

Another embodiment of the present invention comprises FIGS. 6, 7 and 8 wherein the dispersion means 30, in the form of a polyurethane material or other porous substance is applied to compartment 16 in a fluid or non-cured state by applicator means generally indicated as 50. The applicator means 50 may comprise any conventional applicator nozzle or like element 52 supplied through connecting conduit 54 to an adequate supply of the porous composition in its non-cured state as indicated by directional arrow 56. Upon application to the second compartment 16, the dispersion strip 33 adheres to the interior surface 35 of the compartment 16. Upon curing, the dispersion strip 33 is thereby securely formed therein. Disposition and application of the strip 33 is such as to allow a protrusion 37 to extend from the interior of compartment 16 above and into the exterior surrounding the conduit as set forth with respect to the description of FIGS. 1 and 2 above.

In application, the applicator means 50 in the form of nozzle 52 delivers the un-cured porous material 33' into the interior of compartment 16 in the uncured state. Upon curing, the dispersion strip 33 adheres to the interior surface 35 of the compartment 16 and forms a substantial liquid tight seal between the surface 35 and the dispersion strip 33.

In operation, irrespective of the embodiment utilized, water passes into the first compartment 14 from an adequate water supply (not shown) and passes into the second compartment through the interconnecting means 20 which establishes fluid communiction between the two compartments. Upon entering the interior of the second compartment 16, the water is "absorbed" by the dispersion strip 32. Due to capillary action, the water permeates the entire strip and passes therethrough to the exterior of conduit 10. At this point it is dispersed along a predetermined path determined by the disposition of the conduit 10 within the surrounding soil or atmosphere.

It will thus be seen that the objects made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. An irrigation device of the type primarily designed to deliver liquid along a predetermined path, said device comprising: conduit means including a substantially elongated configuration, said conduit means comprising at least a first compartment and a second compartment closely adjacent to and parallel to said first compartment and connected in fluid communication with one another, said conduit means comprising a one piece wall of extruded material integrally formed and configured to define said first and second compartment, interconnecting means disposed in interconnecting fluid communication between said first and second compartments; dispersion means comprising an elongated resilient liquid permeable porous material dimensioned to be greater than second compartment and mounted therein, said a portion of said dispersion means being compressed to occupy all of said second compartment with the remaining portion of said dispersion means extending outwardly therefrom in fluid communication with the exterior of said conduit means.

2. An irrigation device as in claim 1 wherein said wall comprises a predetermined configuration defining said first compartment to include a greater transverse dimension and resulting volume than said second compartment.

3. An irrigation device as in claim 1 wherein said one piece wall comprises a substantially figure eight cross-sectional configuration.

4. An irrigation device as in claim 1 wherein said interconnecting means comprises aperture means disposed at the junction of said first and second compartment, whereby liquid passes from said first compartment to said second compartment through said aperture means.

5. An irrigation device as in claim 4 wherein said aperture means comprises a plurality of apertures, disposed along the length of said conduit means, said plurality of apertures configured to regulate the rate of fluid flow between said first and second compartments.

6. An irrigation device as in claim 4 wherein said dispersion means comprises an elongated strip of flexible urethane material frictionally disposed within said second compartment continuously along the length thereof, whereby liquid passes from said first compartment to said second compartment through said aperture means and from said second compartment to the exterior of said conduit means through said dispersion means.

7. An irrigation device as in claim 1 wherein said interconnecting means comprises an elongated configuration extending along the length of said conduit means.

8. An irrigation device of the type primarily designed to deliver liquid along a predetermined path, said device comprising: conduit means including a substantially elongated configuration, said conduit means comprising at least a first compartment and a second compartment closely adjacent to and parallel to said first compartment and connected in fluid communication with one another, interconnecting means disposed in interconnecting fluid communication between said first and second compartments within said conduit means; dispersion means comprising an elongated resilient liquid permeable porous material of a size greater than said second compartment, a portion of said dispersion means being compressed to completely fill said second compartment in resilient frictional engagement with the inner surface of said second compartment, the remaining portion of said dispersion means configured to extend outwardly from said second compartment in fluid communication with the exterior of said conduit means.

9. An irrigation device as in claim 8 wherein said porous material is deposited within said second compartment along a continuous portion of the length thereof.

10. A method of forming an irrigation device comprising the steps of:
  a. Forming a conduit means in a continuous predetermined length,
  b. Forming at least a first and second compartment within said conduit means in fluid communication with one another,
  c. Disposing a dispersion means of liquid permeable porous material in said second compartment in an uncured state,
  d. Curing said porous material within said second compartment,
  said cured porous material extends to the exterior of said conduit means and in fluid communication between said first compartment and the exterior of said conduit means.

11. A method of forming an irrigation device as in claim 10 further comprising in step (c) thereof disposing said porous material in an uncured state continuously along a predetermined length of said conduit means.

12. A method of forming an irrigation device as in claim 10 further comprising in step (d) thereof adhering said porous material to the inner surface of said second compartment simultaneously to curing said porous material.

13. A method of forming said irrigation device as in claim 10 further comprising in step (a) thereof forming said conduit means into an integral, continuous one piece unit, integrally interconnecting said first and second compartments to one another.

* * * * *